(12) United States Patent
Marom

(10) Patent No.: US 7,372,607 B2
(45) Date of Patent: May 13, 2008

(54) APPARATUS FOR REDUCING DROPS IN A TRANSMISSION SPECTRUM DUE TO INTER-PIXEL GAPS

(75) Inventor: Dan M. Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 307 days.

(21) Appl. No.: 11/241,853

(22) Filed: Oct. 1, 2005

(65) Prior Publication Data

US 2007/0076285 A1   Apr. 5, 2007

(51) Int. Cl.
G02F 1/03 (2006.01)
G02F 1/29 (2006.01)
G02B 26/00 (2006.01)
G02B 5/18 (2006.01)
H04J 14/02 (2006.01)

(52) U.S. Cl. ............... 359/245; 359/254; 359/259; 359/263; 359/290; 359/295; 359/298; 359/318; 359/566; 359/569; 359/572; 398/81; 398/87

(58) Field of Classification Search ............... 359/231, 359/245, 254, 259, 263, 316, 318, 566, 569, 359/572, 223, 224, 290–292, 295, 298; 398/81, 398/87, 183, 201
See application file for complete search history.

(56) References Cited

U.S. PATENT DOCUMENTS

| 6,922,502 | B2 | 7/2005 | Leuthold et al. |
| 7,262,898 | B2 * | 8/2007 | Marom et al. ............... 359/245 |
| 2004/0027670 | A1 * | 2/2004 | Hasman et al. ............. 359/566 |

* cited by examiner

*Primary Examiner*—Evelyn A. Lester

(57) ABSTRACT

The invention includes an apparatus for modulating an optical signal. The apparatus includes a spatial dispersion mechanism and a modulating mechanism. The spatial dispersion mechanism spatially disperses the optical signal. The spatially dispersed optical signal has a plurality of frequency components where each frequency component has an associated beam size. The modulating mechanism includes an array of modulating components where each modulating component has a pitch. The pitch of each modulating component is substantially equal to or less than the beam size of each frequency component.

20 Claims, 4 Drawing Sheets

300

400

APPARATUS FOR REDUCING DROPS IN A TRANSMISSION SPECTRUM DUE TO INTER-PIXEL GAPS

CROSS-REFERENCE TO RELATED APPLICATIONS

This patent application is related to U.S. Patent Application entitled "Apparatus For Reducing Drops in a Transmission Spectrum Due to Inter-Pixel Gaps," Ser. No. 11/241, 830, filed Oct. 1, 2005, which is herein incorporated by reference in its entirety.

FIELD OF THE INVENTION

The invention relates to the field of communication networks and, more specifically, to optical signal processing.

BACKGROUND OF THE INVENTION

In general, optical components for switching or attenuating selected channels in wavelength division multiplexed (WDM) systems are useful in optical network elements, such as reconfigurable optical add-drop multiplexers (ROADMs). A spatial dispersion module is typically employed in such devices for spatially dispersing optical signals and projecting the spatially dispersed optical signals on a spatial light modulator.

A spatial light modulator for wavelength division multiplexing (WDM) applications is typically comprised of a one-dimensional pixel array for modulating incident optical signals, where each pixel is assigned to a different wavelength channel and the operation of each pixel varies according to the application of the spatial light modulator. For example, a pixel may attenuate an optical signal (e.g., for an optical channel blocker) or switch an optical signal between optical fibers (e.g., for a wavelength selective switch).

In existing spatial light modulators, the one-dimensional pixel array is configured such that there is a finite pixel gap between each pair of adjacent pixels in the one-dimensional pixel array. Furthermore, the one-dimensional pixel array is configured such that each pixel in the one-dimensional pixel array has an associated pixel pitch that matches the system channel spacing (e.g., 100 GHz).

Disadvantageously, however, pixel gaps between pixels in the pixel array produce spectral transmission dips. As such, optical transmission systems utilizing dynamic bandwidth allocation would incur substantial transmission penalties from such spectral transmission dips. Specifically, any signal component present at the location of an inter-pixel gap is distorted from the cumulative effects of amplitude and phase variations at the resulting transmission drops.

SUMMARY OF THE INVENTION

Various deficiencies in the prior art are addressed through the invention of an apparatus for modulating an optical signal. One such apparatus includes a spatial dispersion mechanism for spatially dispersing an optical signal, the spatially dispersed optical signal including a plurality of frequency components. One such apparatus includes a modulating mechanism having an array of modulating components. In one such apparatus, the spatially dispersed optical signal is incident on at least a portion of the array of modulating components. In one such apparatus, the pitch of each modulating component is substantially equal to or less than the beam size of each frequency component. Another apparatus includes an array of modulating components where adjacent ones of the modulating components are separated by gaps. The gaps are formed at an angle to the dispersion direction of the spatially dispersed optical signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of an optical signal processing system; however, the present invention can be readily applied to other optical systems. In general, the present invention includes an apparatus for reducing transmission drops in a modulated transmission spectrum which result from inter-component gaps between adjacent modulating components of a one-dimensional spatial light modulator. The present invention, by reducing the transmission drops in a modulated transmission spectrum, increases the smoothness of the modulated transmission spectrum. As such, by smoothing the modulated transmission spectrum, the present invention thereby enables flexible allocation of optical bandwidth.

In accordance with the present invention, a reduction in transmission drops of a modulated transmission spectrum is achieved using various combinations of modulating component contour and modulating component pitch. In one embodiment, transmission drops in a modulated transmission spectrum are reduced by setting modulating component pitch less than or equal to the optical signal beam size of a spectral component of a spatially dispersed optical signal. In one embodiment, transmission drops in a modulated transmission spectrum are reduced by modifying the modulating component contour such that localization of the modulating component gap on a particular frequency range of an incident optical signal is reduced (e.g., using parallelogram shaped modulating components, curvilinear shaped modulating components, and the like).

Figure 1:
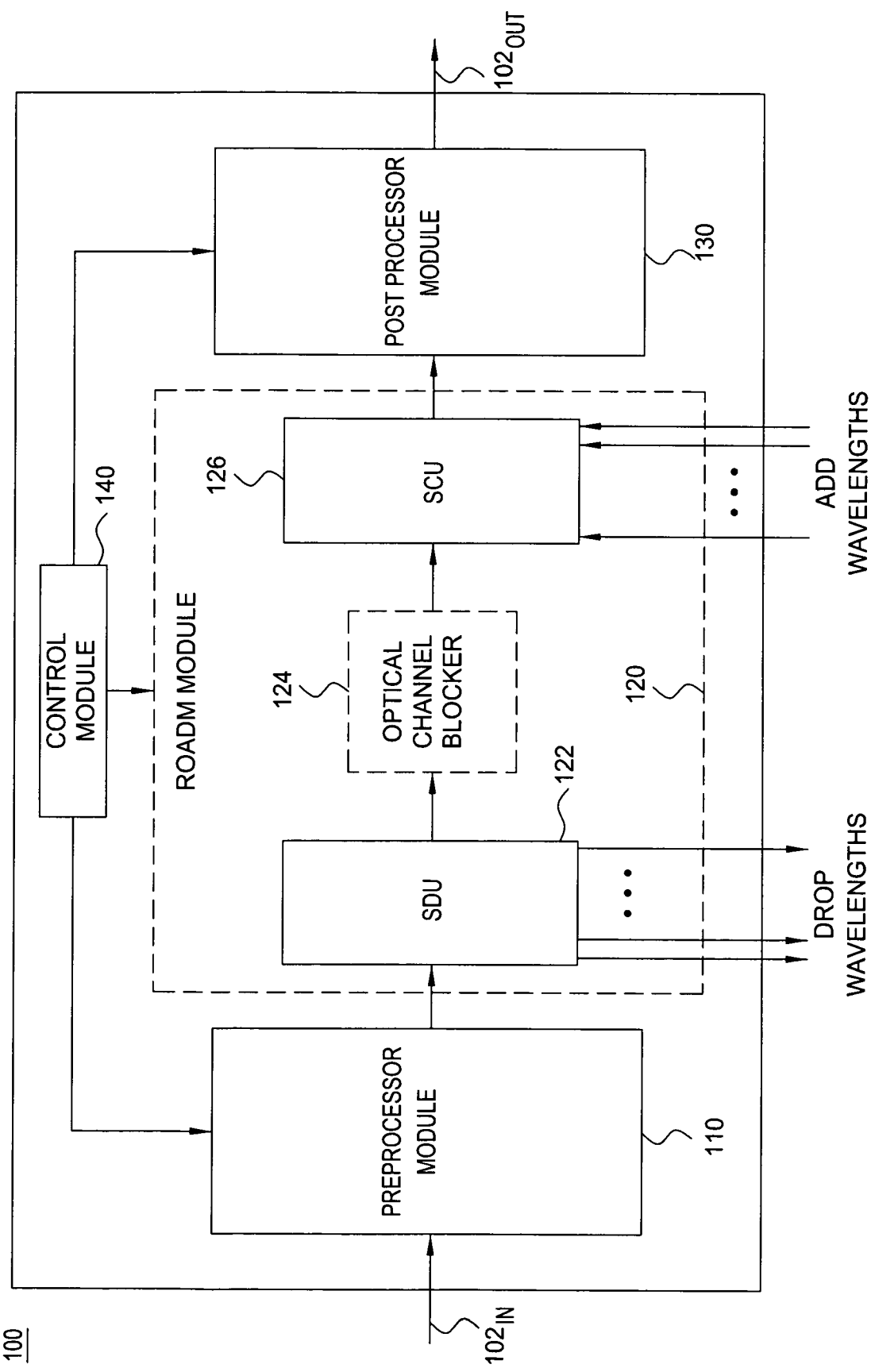
FIG. 1 depicts a high-level block diagram of an optical signal processing system.

FIG. 1 depicts a high-level block diagram of an optical signal processing system. As depicted in FIG. 1, optical signal processing system 100 includes a preprocessor module (PM) 110, a reconfigurable optical add-drop multiplexer (ROADM) 120, a postprocessor module (PM) 130, and a control module (CM) 140. As depicted in FIG. 1, CM 140 communicates with each of PM 110, ROADM 120, and PM 130. As depicted in FIG. 1, CM 140 receives and executes commands adapted for controlling PM 110, ROADM 120, and PM 130. Similarly, as depicted in FIG. 1, CM 140 generates and communicates commands adapted for controlling PM 110, ROADM 120, and PM 130.

As depicted in FIG. 1, PM 110 receives optical signals from an upstream network element (not depicted) via an optical input fiber $102_{IN}$. The PM 110 performs preprocessing of the received optical signals. The PM 110 sends the preprocessed optical signals to ROADM 120. As depicted in FIG. 1, ROADM 120 receives preprocessed optical signals from PM 110. The ROADM 120 performs add-drop switching of the preprocessed optical signals. The ROADM 120 sends the switched optical signals to PM 130. As depicted in FIG. 1, PM 130 receives the switched optical signals from ROADM 120. The PM 130 performs post-processing on the switched optical signals. The PM 130 transmits optical signals towards a downstream network element (not depicted) via an optical output fiber $102_{OUT}$.

As depicted in FIG. 1, PM 110 is operable for performing various optical signal pre-processing functions. For example, PM 110 may include optical power monitoring modules, optical amplifiers, dispersion compensation modules, and like optical signal pre-processing modules. As depicted in FIG. 1, PM 130 is operable for performing various optical signal post-processing functions. For example, PM 130 may include operational amplifiers, optical service channel filters, and like optical signal post-processing modules. Although described with respect to specific functions, those skilled in the art will appreciate that PM 110 and PM 130 may perform various other optical signal processing functions.

As depicted in FIG. 1, ROADM 120 may include a signal distribution unit (SDU) 122, a signal combination unit (SCU) 126, and, optionally, an optical channel blocker (OCB) 124. The SDU 122 receives preprocessed optical signals from PM 110. The SDU 122, which may be either a wavelength selective switch or a passive splitter, drops a first portion of the preprocessed optical signals, and allows a second portion of the preprocessed optical signals to pass through. The optional OCB 124 receives the pass-through optical signals. The optional OCB 124 performs channel blocking functions on the pass-through optical signals. The optional OCB 124 allows at least a portion of the pass-through optical signals to pass through to SCU 126. The SCU 126 receives pass-through optical signals directly from SDU 124, or, optionally, indirectly from SDU 124 via OCB 124. The WSS 126 adds optical signals to the pass-through optical signals to form switched optical signals. The SCU 126, which may either be a wavelength selective switch or a passive combiner, passes the switched optical signals to PM 130.

Although depicted and described with respect to specific functional components of an optical signal processing system, the present invention is not intended to be limited to a specific optical signal processing system configuration. As such, although depicted and described within the context of a particular optical signal processing system, the present invention may be used in various other optical signal processing systems. Furthermore, although explicitly depicted and described with respect to FIG. 1, those skilled in the art will appreciate that spatial light modulators may be used in different components of the optical signal processing system depicted and described with respect to FIG. 1. For example, a spatial light modulator in accordance with the present invention may be used in optical wavelength selective switches, optical channel blockers, and like optical signal processing modules and systems.

In general, a spectral optical processor/switch spatially disperses a received optical signal such that a spatially dispersed optical signal is incident on a spatial light modulator for performing various functions. In one embodiment, for example, a spatial light modulator switches the incident optical signal from an optical input fiber to an optical output fiber (e.g., for a wavelength selective switching device). In one embodiment, for example, a spatial light modulator attenuates the incident optical signal (e.g., for optical channel blockers). In general, a spatial light modulator includes a plurality of modulating components. The spatially dispersed optical signal (i.e., the optical signal spectrum) is incident on the modulating components.

As described herein, each modulating component (e.g., pixel) of the present invention is adjustable for modulating (e.g., attenuating, switching, and the like) the portion of the optical signal spectrum incident on that modulating component. The modulating component arrangements for different embodiments of the present invention are depicted and described herein with respect to FIG. 2 (i.e., modulating components have an associated pitch less than or equal to a beam size), FIG. 3 (i.e., modulating components have a parallelogram shape for reducing localization of inter-pixel gap effects), and FIG. 4 (i.e., modulating components have a curvilinear shape for reducing localization of inter-pixel gap effects).

Figure 2:
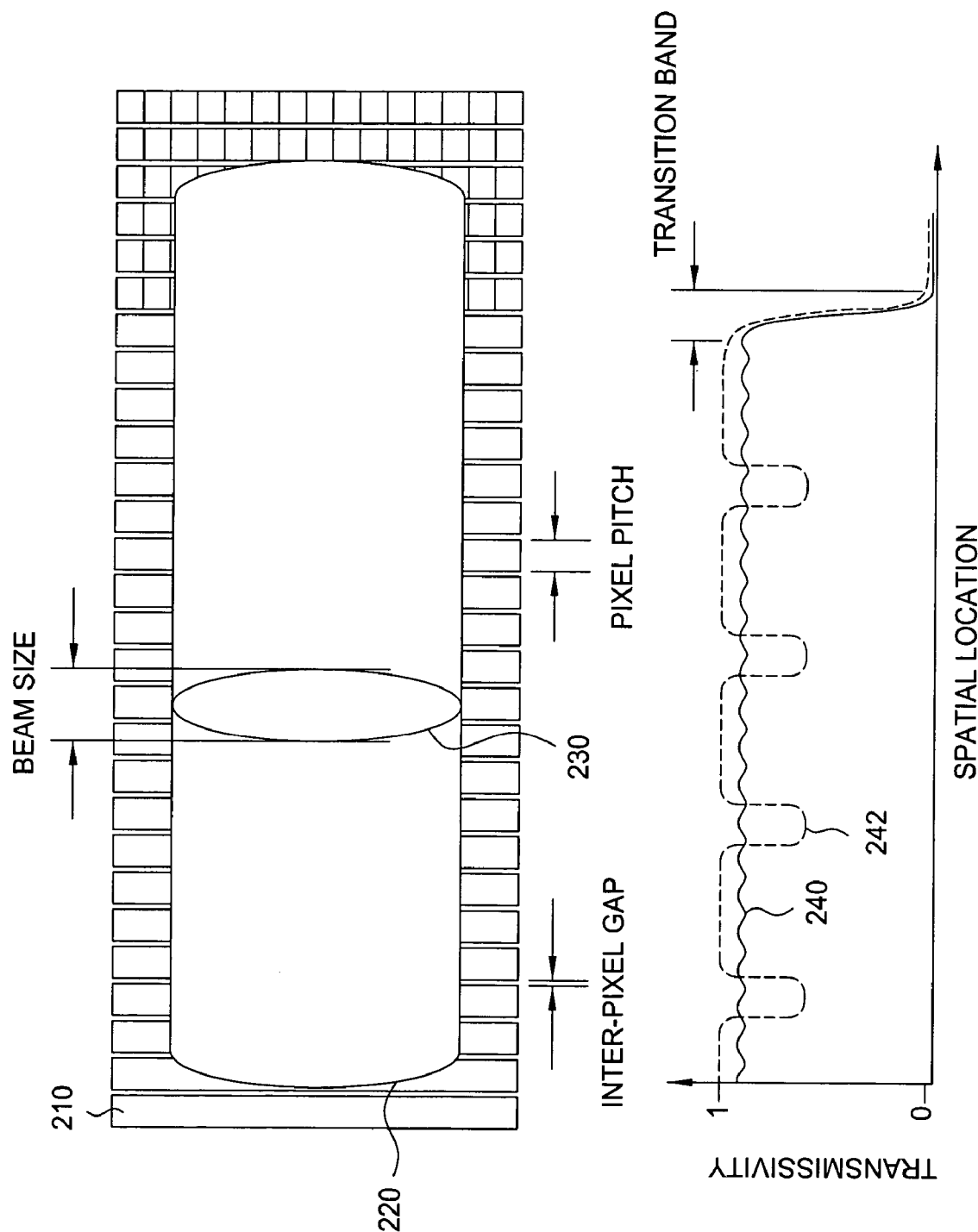
FIG. 2 depicts a spatial light modulator according to one embodiment of the invention.

FIG. 2 depicts a spatial light modulator according to one embodiment of the invention. Specifically, spatial light modulator 200 of FIG. 2 includes a plurality of pixels 210 (collectively, pixels 210). As depicted in FIG. 2, each of the pixels 210 has a rectangular shape and an associated pixel pitch (i.e., the width of a pixel along the dispersion direction of the incident spatially dispersed optical signal). The pixels 210 form a one-dimensional pixel array in which the pixels 210 are contiguous along the dispersion direction of the incident spatially dispersed optical signal. The pixels 210 are separated by an associated plurality of inter-pixel gaps.

As depicted in FIG. 2, a spatially dispersed optical signal 220 is incident upon spatial light modulator 200 such that the dispersed optical spectrum is stretched across all, or at least a majority of pixels 210. The dispersion of an optical signal for forming a spatially dispersed optical signal is generally known in the art. In one embodiment, spatial dispersion of an optical signal may be performed using a pair of lenses and a diffraction grating. For example, a received optical signal radiating from an input optical fiber may be collimated by a first lens. In continuation of this example, the collimated optical signal may be incident on a diffraction grating that spatially disperses the received optical signal. In continuation of this example, the spatially dispersed optical signal may then be directed, using a second lens, such that the dispersed optical signal is incident on a spatial light modulator.

As depicted in FIG. 2, a single-frequency optical signal 230 of spatially dispersed optical signal 220 is incident upon spatial light modulator 200. For any single-frequency optical signal in an optical signal spectrum, the light beam has an elliptical Gaussian shape and a finite size. As depicted in FIG. 2, single-frequency optical signal 230 is incident upon three pixels 210. Since pixel pitch is less than or equal to beam size, depending on the location of a single-frequency component of a spatially dispersed optical signal, the single-frequency component of a spatially dispersed optical signal is incident on at least two pixels. Although one single-frequency optical signal 230 of spatially dispersed optical signal 220 is depicted, additional single-frequency optical signals (not depicted) of spatially dispersed optical signal 220 may be incident on other combinations of pixels 210.

As depicted in FIG. 2, single-frequency optical signal 230 of spatially dispersed optical signal 220 has an associated beam size. In the embodiment of the present invention, depicted and described with respect to FIG. 2, pixel pitch P is set to be on the order of beam width equal to $2w_0$. In one such embodiment, pixel pitch is less than or equal to beam size. The resulting modulated transmission spectrum 240 depicts a spectrum in which transmission drops typically associated with existing spatial light modulators (illustratively, represented by modulated transmission spectrum 242) are reduced.

In this embodiment, the Gaussian beam mode does not resolve the individual pixels and transmission drops in the modulated transmission begin to decrease in magnitude. As described herein, reduction of the transmission drops is accompanied by a drop in the transmission level (i.e., transmissivity). In one embodiment, magnitude variations (i.e., ripple) in the modulated transmission spectrum may be reduced by reducing pixel pitch; however, as pixel pitch (and, therefore, the passband ripple) is reduced, the associated transmission level is reduced. As such, selection of pixel pitch in accordance with the present invention requires balancing between reduction of transmission drops in the modulated transmission spectrum and reduction of transmissivity of the modulated transmission spectrum.

As depicted in FIG. 2, modulated transmission spectrum 240 is represented according to spatial location (illustratively, on the abscissa) and transmissivity (illustratively, on the ordinate axis). Although the transmissivity of modulated transmission spectrum 240 is less than the transmissivity of modulated transmission spectrum 242, the significant reduction of the transmission drops associated with modulated transmission spectrum 242 significantly outweighs the insignificant reduction in transmissivity (which may be on the order of a one decibel decrease). As such, the present invention enables more efficient optical bandwidth allocation, reduced transmission penalties, and the like.

As depicted in FIG. 2, an activated pixel is denoted by horizontal hatch lines (illustratively, the six rightmost pixels 210). The modulated transmission spectrum 240 shows that the transmission spectrum drops significantly for an activated pixel (i.e., the transmission spectrum drops from a high transmission value to a low transmission value over finite bandwidth denoted as a transition band). As depicted in FIG. 2, the transition band associated with modulated transmission spectrum 240 (e.g., of an optical channel blocker in accordance with the present invention) is identical to the transition band associated with modulated transmission spectrum 242 (e.g., of an optical channel blocker not in accordance with the present invention). The transition band size is a function of the Gaussian mode size in the dispersion direction and the spatial dispersion (i.e., the transition band is constrained by the beam size). The minimization of the transmission band is desirable in high spectral efficiency devices.

Figure 3:
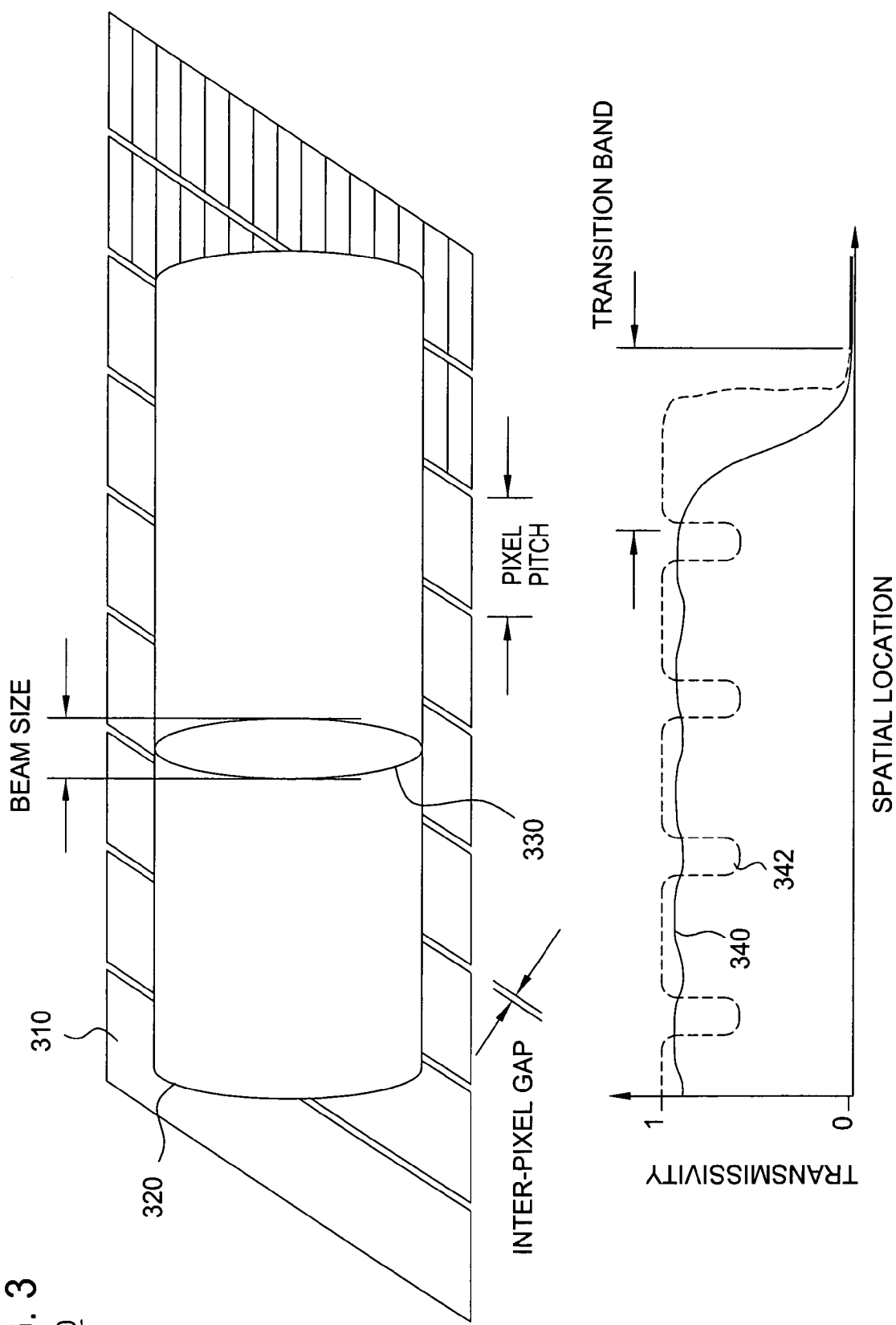
FIG. 3 depicts a spatial light modulator according to one embodiment of the invention.

FIG. 3 depicts a spatial light modulator according to one embodiment of the invention. Specifically, spatial light modulator 300 of FIG. 3 includes a plurality of pixels 310 (collectively, pixels 310). As depicted in FIG. 3, each of the pixels 310 has an associated pixel pitch. The pixels 310 are separated by an associated plurality of inter-pixel gaps. As depicted in FIG. 3, each inter-pixel gap separating a pair of pixels 310 is formed at an angle to the incident optical signal spatial dispersion (denoted as inter-pixel gap slope). As such, as depicted in FIG. 3, each pixel 310 has an oblique shape (illustratively, a parallelogram shape). The pixels 310 form a one-dimensional pixel array in which pixels 310 are adjacent along the longer edge.

As depicted in FIG. 3, a spatially dispersed optical signal 320 is incident upon spatial light modulator 300 such that the dispersed optical spectrum is stretched across at least a portion of the pixels 310. The dispersion of an optical signal for forming a spatially dispersed optical signal is generally known in the art. In one embodiment, spatial dispersion of an optical signal may be performed using a pair of lenses and a diffraction grating. For example, a received optical signal radiating from an input optical fiber may be collimated by a first lens. In continuation of this example, the collimated optical signal may be incident on a diffraction grating that spatially disperses the received optical signal. In continuation of this example, the spatially dispersed optical signal may then be directed, using a second lens, such that the dispersed optical signal is incident on a spatial light modulator.

As depicted in FIG. 3, a single-frequency optical signal 330 of spatially dispersed optical signal 320 is incident upon spatial light modulator 300 such that the single-frequency optical signal 330 is incident upon three pixels 310. Since inter-pixel gaps are formed at an angle, depending upon the inter-pixel gap slope, the beam size of a single-frequency component of a spatially dispersed optical signal, and the location of a single-frequency component of a spatially dispersed optical signal, the single-frequency component may be incident upon different numbers of pixels. Although one single-frequency optical signal 330 of spatially dispersed optical signal 320 is depicted, additional single-frequency optical signals (not depicted) of spatially dispersed optical signal 320 may be incident on other combinations of pixels 310.

As depicted in FIG. 3, single-frequency optical signal 330 of spatially dispersed optical signal 320 has an associated beam size. In the embodiment of the present invention depicted and described with respect to FIG. 3, pixel shape is modified in order to reduce the influence region of an inter-pixel gap (i.e., reduce the localization of an inter-pixel gap on particular single-frequency components of a spatially dispersed optical signal), thereby reducing the effects of inter-pixel gaps on transmission smoothness. As inter-pixel gap slope decreases, the associated influence region of the inter-pixel gap widens, decreasing localization of the inter-pixel gap, thereby reducing transmission drops in the modulated transmission spectrum.

As described herein, reduction of the transmission drops is accompanied by a drop in the transmission level (i.e., transmissivity). In one embodiment, magnitude variations (i.e., ripple) in the modulated transmission spectrum may be reduced by reducing pixel pitch; however, as pixel pitch (and, therefore, the passband ripple) is reduced, the associated transmission level is reduced. Furthermore, in this embodiment, the inter-pixel gap slope and beam ellipticity parameters impact ripple magnitude. As such, in this embodiment, various modulated transmission spectrum magnitudes may be achieved by adjusting at least one of pixel pitch, gap size, inter-pixel gap slope, spatial dispersion and beam ellipticity, as well as various combinations thereof.

As depicted in FIG. 3, the resulting modulated transmission spectrum 340 depicts a spectrum in which transmission drops typically associated with existing spatial light modulators (illustratively, represented by modulated transmission spectrum 342) are significantly reduced. The modulated transmission spectrum 340 is represented according to spatial location (illustratively, on the abscissa) and transmissivity (illustratively, on the ordinate axis). Although the transmissivity of modulated transmission spectrum 340 is less than the transmissivity of modulated transmission spectrum 342, the significant reduction of the transmission drops associated with modulated transmission spectrum 342 significantly outweighs the insignificant reduction in transmissivity (which may be on the order of a one decibel decrease). As such, the present invention enables more efficient optical bandwidth allocation, reduced transmission penalties, and the like.

As depicted in FIG. 3, an activated pixel is denoted by horizontal hatch lines (illustratively, the two rightmost pixels 310). The modulated transmission spectrum 340 shows that the transmission spectrum drops significantly for an activated pixel (i.e., the transmission spectrum drops from a high transmission value to a low transmission value over finite bandwidth denoted as a transition band). As depicted in FIG. 3, the transition band associated with modulated transmission spectrum 340 (e.g., of an optical channel blocker in accordance with the present invention) is larger than the transition band associated with modulated transmission spectrum 342 (e.g., of an optical channel blocker not in accordance with the present invention). Since the minimization of the transmission band is desirable in high spectral efficiency devices, allowable transmission ripple magnitude must be balanced against transition band extent.

Figure 4:
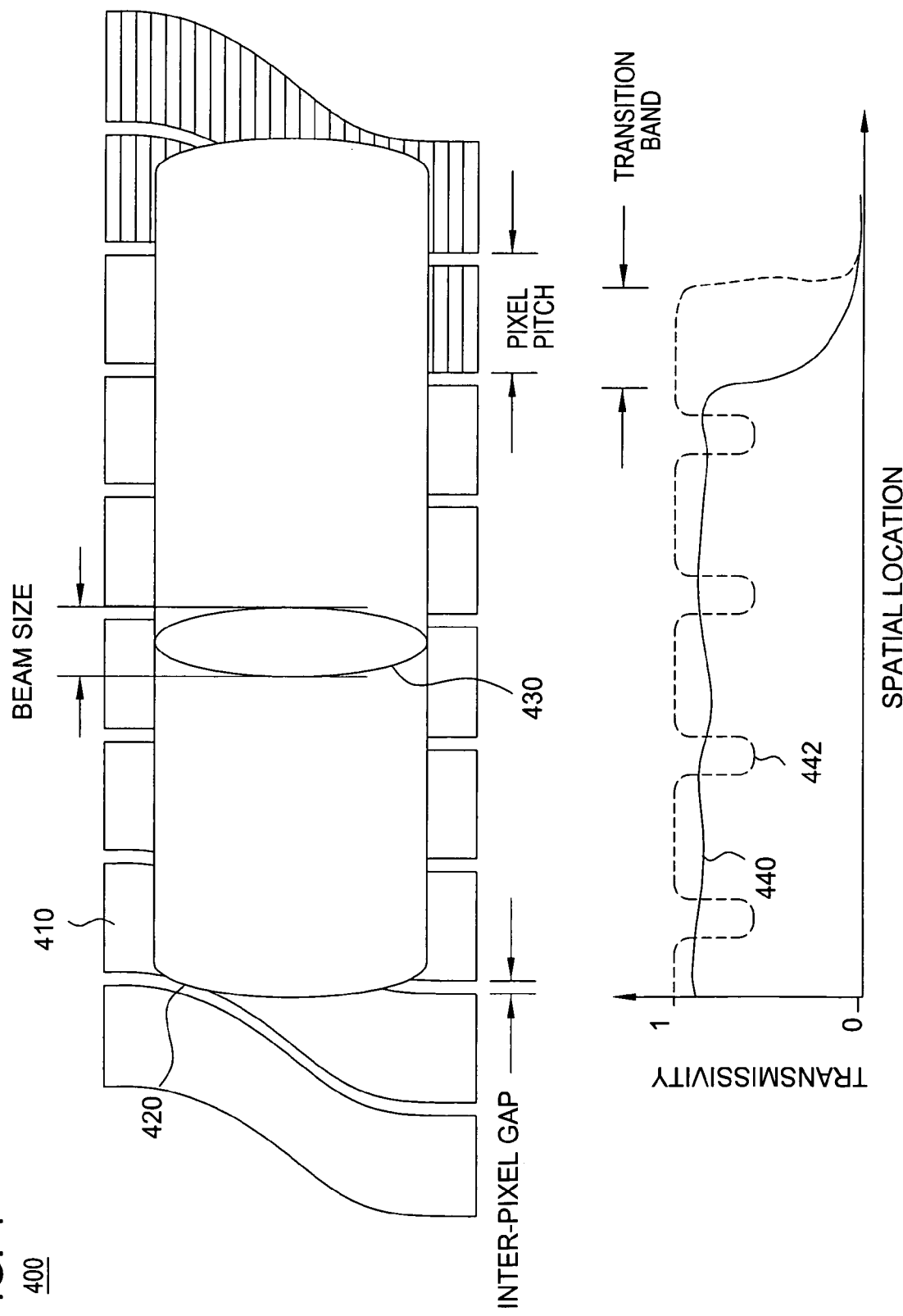
FIG. 4 depicts a spatial light modulator according to one embodiment of the invention.

FIG. 4 depicts a spatial light modulator according to one embodiment of the invention. Specifically, spatial light modulator 400 of FIG. 4 includes a plurality of pixels 410 (collectively, pixels 410). As depicted in FIG. 4, each of the pixels 410 has an associated pixel pitch. The pixels 410 are separated by an associated plurality of inter-pixel gaps. As depicted in FIG. 4, each inter-pixel gap separating a pair of pixels 410 is formed as a curvilinear inter-pixel gap. In one embodiment, each curvilinear inter-pixel gap includes a first gap portion having decreasing slope and a second gap portion having increasing slope. One exemplary profile follows an inverse error function profile. As such, as depicted in FIG. 4, each pixel 410 has an oblique shape (illustratively, a curvilinear shape). The pixels 410 form a one-dimensional pixel array in which pixels 410 are adjacent contiguous along the dispersion direction of the spatially dispersed optical signal.

As depicted in FIG. 4, a spatially dispersed optical signal 420 is incident upon spatial light modulator 400 such that the dispersed optical spectrum is stretched across at least a portion of the pixels 410. The dispersion of an optical signal for forming a spatially dispersed optical signal is generally known in the art. In one embodiment, spatial dispersion of an optical signal may be performed using a pair of lenses and a diffraction grating. For example, a received optical signal radiating from an input optical fiber may be collimated by a first lens. In continuation of this example, the collimated optical signal may be incident on a diffraction grating that spatially disperses the received optical signal. The spatially dispersed optical signal may then be directed, using a second lens, such that the dispersed optical signal is incident on a spatial light modulator.

As depicted in FIG. 4, a single-frequency optical signal 430 of spatially dispersed optical signal 420 is incident upon spatial light modulator 400 such that the single-frequency optical signal 430 is incident upon two pixels 410. Since inter-pixel gaps are formed at a curvilinear angle, depending upon the inter-pixel gap contour, the beam size of a single-frequency component of a spatially dispersed optical signal, and the location of a single-frequency component of a spatially dispersed optical signal, the single-frequency component may be incident upon different numbers of pixels. Although one single-frequency optical signal 430 of spatially dispersed optical signal 420 is depicted, additional single-frequency optical signals (not depicted) of spatially dispersed optical signal 420 may be incident on other combinations of pixels 410.

As depicted in FIG. 4, single-frequency optical signal 430 of spatially dispersed optical signal 420 has an associated beam size. As depicted in FIG. 4, pixel shape is modified in order to increase the influence region of an inter-pixel gap, thereby reducing the effects of inter-pixel gaps on transmission spectrum smoothness. The curvilinear pixels are adapted for using continuous changes in inter-pixel gap slope for further reducing the small transmission drops still present in a modulated transmission spectrum. As described herein, in the dispersion direction of a spatially dispersed optical signal, a first portion of a curvilinear pixel has a decreasing slope and a second portion of a curvilinear pixel has an increasing slope.

As described herein, reduction of transmission drops in the modulated transmission spectrum is accompanied by a drop in transmission level (i.e., transmissivity). In one embodiment, magnitude variations (i.e., ripple) in the modulated transmission spectrum may be reduced by reducing pixel pitch; however, as pixel pitch (and, therefore, the passband ripple) is reduced, the associated transmission level is reduced. Furthermore, in this embodiment, the inter-pixel gap slope and beam ellipticity parameters impact ripple magnitude. As such, in this embodiment, various modulated transmission spectrum magnitudes may be achieved by adjusting at least one of pixel pitch, gap size, curvilinear inter-pixel gap contour (i.e., modifying the inter-pixel gap slope changes), spatial dispersion, and beam ellipticity, as well as various combinations thereof.

As depicted in FIG. 4, the resulting modulated transmission spectrum 440 depicts a spectrum in which transmission drops typically associated with existing spatial light modulators (illustratively, represented by modulated transmission spectrum 442) are significantly reduced. The modulated transmission spectrum 440 is represented according to spatial location (illustratively, on the abscissa) and transmissivity (illustratively, on the ordinate axis). Although the transmissivity of modulated transmission spectrum 440 is less than the transmissivity of modulated transmission spectrum 442, the significant smoothing of modulated transmission spectrum 442 outweighs the reduction in transmissivity (which may be on the order of a one decibel decrease). As such, the present invention enables more efficient optical bandwidth allocation, reduced transmission penalties, and the like.

As depicted in FIG. 4, an activated pixel is denoted by horizontal hatch lines (illustratively, the two rightmost pixels 410). The modulated transmission spectrum 440 shows that the transmission spectrum drops significantly for an activated pixel (i.e., the transmission spectrum drops from a high transmission value to a low transmission value over finite bandwidth denoted as a transition band). As depicted in FIG. 4, the transition band associated with modulated transmission spectrum 440 (e.g., of an optical channel blocker in accordance with the present invention) is larger than the transition band associated with modulated transmission spectrum 442 (e.g., of an optical channel blocker not in accordance with the present invention), but smaller than the transition band associated with modulated transmission spectrum 340. Since the minimization of the transmission band is desirable in high spectral efficiency devices, allowable transmission ripple magnitude must be balanced against transition band extent (i.e., using an inverse error function contour for minimizing the transition bandwidth while also minimizing ripple).

Although described herein with respect to one-dimensional pixel arrays of pixels having particular pixel contours, pixel pitches, and associated inter-pixel gap contours, those skilled in the art will appreciate that one-dimensional pixel arrays of pixels having various other pixel contours, pixel pitches, and associated inter-pixel gap contours may be used in accordance with the present invention. Specifically, although described herein with respect to a one-dimensional pixel array of pixels having pixel pitches less than or equal to beam size, a one-dimensional pixel array of parallelogram shaped pixels, and a one-dimensional pixel array of curvilinear shaped pixels, those skilled in the art will appreciate various other pixel shapes may be used in accordance with the present invention.

The inter-pixel gap effect of such one-dimensional pixel arrays may be analytically calculated. In optical systems in which optical signals originate and terminate from single-mode optical fibers, the spatial mode of the resulting light beam is approximately elliptically Gaussian. The location of a Gaussian mode is frequency dependent due to spatial dispersion provided by the optical system. As such, for an optical signal having an elliptically Gaussian mode centered at $x_0$ and ellipticity A (where ellipticity measures the ratio of the height of the Gaussian mode to the width of the Gaussian mode), the normalized mode is defined by Eq. 1:

$$\sqrt{\frac{2}{\pi}} \frac{1}{w_0 \sqrt{A}} \exp\left[-\frac{(x-x_0)^2}{w_0^2} - \frac{(y-y_0)^2}{(Aw_0)^2}\right] \quad \text{Eq. 1}$$

For a narrow inter-pixel gap along a line defined by line $y=m(x-kP)$, where m is the inter-pixel gap slope, k is an integer representing the pixel number in the pixel array, and P is the pixel pitch, with the inter-pixel gap in place and the pixels adjacent to the inter-pixel gap in full transmission (i.e., transmissivity=1), the coupling efficiency $\eta$ is approximated as shown in Eq. 2. This approximation of the coupling efficiency $\eta$ applies to straight pixel edges, including rectangular shaped pixels (as depicted and described with respect to FIG. 2) and parallelogram shaped pixels (as depicted and described with respect to FIG. 3).

$$\eta = \left(1 - \sqrt{\frac{2}{\pi}} \frac{\text{gap}}{w_0} \frac{\sqrt{1+m^2}}{\sqrt{A^2+m^2}} \exp\left[-\frac{\frac{m^2}{A^2}(x_0 - KP)^2}{\frac{w_0^2}{2}\left(1+\frac{m^2}{A^2}\right)}\right]\right)^2 \quad \text{Eq. 2}$$

In accordance with the coupling efficiency approximations of Eq. 2, the coupling efficiency $\eta$ approaches one ($\eta \to 1$) with no spatial dependence as gap size approaches zero (gap$\to$0). Furthermore, as inter-pixel gap slope decreases, the influence region widens (i.e., the influence region becomes less localized, as described herein) and the magnitude of the transmission drop associated with each inter-pixel gap decreases. In one embodiment, in which the pixels in the pixel array are rectangular, the approximation of coupling efficiency $\eta$ may be simplified as shown in Eq. 3:

$$\eta = \left(1 + \sqrt{\frac{2}{\pi}} \frac{\text{gap}}{w_0} \exp\left[-\frac{(x_0 - KP)^2}{\frac{w_0^2}{2}}\right]\right)^2 \quad \text{Eq. 3}$$

As such, in accordance with Eq. 3, transmission drops occur whenever $x_0=KP$, which coincides with the location of the inter-pixel gap. The extent of the transmission drop (or influence region) depends on the inter-pixel gap width and the Gaussian mode size in the dispersion direction ($w_0$).

As described herein, the modulating components of a one-dimensional modulating component array in accordance with the present invention may be adapted for achieving various results. In one embodiment, a portion of the plurality of modulating components adapt an incident, spatially dispersed optical signal for smoothing a transmission spectrum of the spatially dispersed optical signal. In one embodiment, a portion of the plurality of modulating components blocks a portion of the spatially dispersed optical signal. In one embodiment, the plurality of modulating components are adapted for reducing a transition band associated with a transmission spectrum of the spatially dispersed optical signal, the transition band comprising a change from a first transmissivity state (e.g., transmissivity substantially close to one) to a second transmissivity state (e.g., transmissivity substantially close to zero).

Although various embodiments which incorporate the teachings of the present invention have been shown and described in detail herein, those skilled in the art can readily devise many other varied embodiments that still incorporate these teachings.

What is claimed is:

1. An apparatus for modulating an optical signal, comprising:
    a spatial dispersion mechanism for spatially dispersing the optical signal, the spatially dispersed optical signal comprising a plurality of frequency components, each frequency component having a beam size; and
    a modulating mechanism, the modulating mechanism comprising a one-dimensional array of modulating components adjacent along a dispersion direction of the spatially dispersed optical signal incident on the one-dimensional array of modulating components, each modulating component having a pitch;
    wherein the pitch of each modulating component is substantially equal to or less than the beam size of each frequency component in the plurality of frequency components.

2. The apparatus of claim 1, the one-dimensional array of modulating components for reducing an extent of transmission drops in a transmission spectrum of the spatially dispersed optical signal.

3. The apparatus of claim 1, the one-dimensional array of modulating components for blocking a portion of the spatially dispersed optical signal.

4. The apparatus of claim 1, the one-dimensional array of modulating components for dynamically allocating optical bandwidth.

5. The apparatus of claim 1, the one-dimensional array of modulating components for performing wavelength selective switching.

6. The apparatus of claim 1, wherein each modulating component in the one-dimensional array of modulating components comprises a tilting micromirror.

7. An apparatus for modulating an optical signal, comprising:
    a spatial dispersion mechanism for spatially dispersing the optical signal, the spatially dispersed optical signal having a dispersion direction; and
    a modulating mechanism, the modulating mechanism comprising a one-dimensional array of modulating components aligned along the dispersion direction, the spatially dispersed optical signal incident upon at least a portion of the modulating components; wherein adjacent ones of the modulating components are separated by gaps; and each gap is formed at an angle to the dispersion direction.

8. The apparatus of claim 7, the one-dimensional array of modulating components for reducing an extent of transmission drops in a transmission spectrum of the spatially dispersed optical signal.

9. The apparatus of claim 7, a portion of the one-dimensional may of modulating components for blocking a portion of the spatially dispersed optical signal.

10. The apparatus of claim 7, the one-dimensional array of modulating components for dynamically allocating optical bandwidth.

11. The apparatus of claim 7, the one-dimensional array of modulating components for reducing a transition band associated with a transmission spectrum of the spatially dispersed optical signal, the transition band comprising bandwidth over which the transmission spectrum changes from a first transmissivity state to a second transmissivity state.

12. The apparatus of claim 7, wherein each gap has a gap contour.

13. The apparatus of claim 12, wherein the gap contour is linear.

14. The apparatus of claim 12, wherein the gap contour is curvilinear, a first portion of the gap contour having a decreasing slope, a second portion of the gap contour having an increasing slope.

15. An apparatus for modulating an optical signal, comprising:

a spatial dispersion mechanism for spatially dispersing the optical signal, the spatially dispersed optical signal having a dispersion direction; and a modulating mechanism, the modulating mechanism comprising a one-dimensional array of modulating components having a plurality of modulating components adjacent along the dispersion direction, the spatially dispersed optical signal incident upon at least a portion of the modulating components; wherein adjacent ones of the modulating components are separated by gaps;

each gap is formed at an angle to the dispersion direction; and each gap has a gap contour.

16. The apparatus of claim 15, wherein the gap contour is linear.

17. The apparatus of claim 15, wherein the gap contour is curvilinear, a first portion of the gap contour having a decreasing slope, a second portion of the gap contour having an increasing slope.

18. The apparatus of claim 15, a portion of the one-dimensional array of modulating components for reducing transmission drops in a transmission spectrum of the spatially dispersed optical signal, enabling thereby dynamic optical bandwidth allocation.

19. An apparatus for modulating an optical signal spectrum, comprising:

a modulating mechanism comprising an array of modulating components, each modulating component having a pitch; wherein an optical signal is incident on at least a portion of the array of modulating components, the incident optical signal comprising a spatially dispersed optical signal having a plurality of frequency components, each frequency component having a beam size; and the pitch of each modulating component is substantially equal to or less than the beam size for reducing thereby an extent of transmission drops in a transmission spectrum of the incident optical signal.

20. An apparatus for modulating an optical signal, comprising:

a modulating mechanism comprising a one-dimensional array of modulating components disposed in a dispersion direction of an incident optical signal; wherein adjacent ones of the modulating components are separated by gaps; and each gap is formed at an angle to the dispersion direction for reducing thereby an extent of transmission drops in a transmission spectrum of the incident optical signal.

* * * * *